Patented July 22, 1941

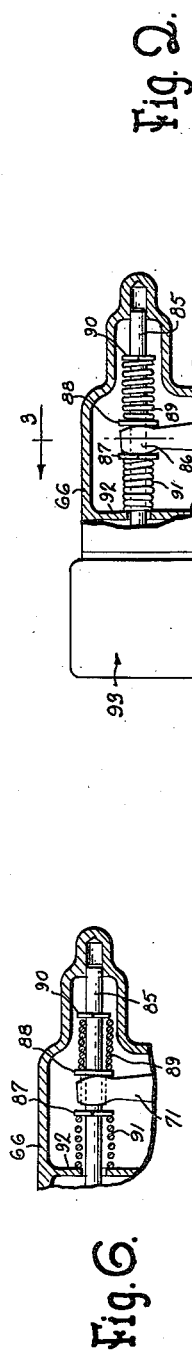

2,250,316

UNITED STATES PATENT OFFICE 2,250,316

MOTOR VEHICLE

Jesse G. Vincent, Grosse Pointe, Mich., assignor to Packard Motor Car Company, Detroit, Mich., a corporation of Michigan Application February 29, 1940, Serial No. 321,387

9 Claims. (Cl. 74—290)

This invention relates to transmissions and more particularly to motor vehicle transmissions having a speed modifying mechanism incorporated therewith.

It is customary to provide motor vehicle transmissions with selective change speed gearing and to associate therewith speed modifying mechanism between such gearing and the tail shaft. Usually such speed modifying mechanism consists of planetary gearing that can be controlled to readily change the drive from the change speed gearing back and forth between direct and modified drive. One form of such control includes a shiftable positive clutch member with which this invention contemplates the association of synchronizing mechanism to insure a quick engagement without clash.

It is also customary to provide an overrunning drive arrangement that is effective between the planetary gearing and the tail shaft in one position of the speed modifying mechanism shift and when this drive relation is utilized for reverse drive, means is provided to establish a positive drive around the overrunning clutch. This invention contemplates the use of a positive drive of this character for locking out the planetary gearing clutch so that it cannot be shifted by its actuator mechanism when the drive is reverse from the selective change speed gearing.

A further object of the invention resides in the provision of actuator mechanism for the clutch of speed modifying mechanism by means of which synchronizing can be effected before the clutch is engaged.

Another object of the invention is to utilize the reverse shift mechanism of change speed gearing for a speed modifying mechanism clutch and sun gear holding means.

Other objects of the invention will appear from the following description taken in connection with the drawings, which form a part of the specification, and in which:

Fig. 2 is a plan view of the transmission partly broken away to better illustrate some of the details;

Fig. 4 is a fragmentary plan view of the clutch synchronizer elements in locked-out position;

Fig. 5 is a fragmentary enlarged sectional view of the speed modifying mechanism shown in Fig. 2;

Fig. 6 is a fragmentary sectional view of the clutch actuating mechanism shown in Fig. 2 but in a different position of adjustment occupied while clutch synchronizing is being effected prior to engagement of the clutch.

Figures 1, 3:
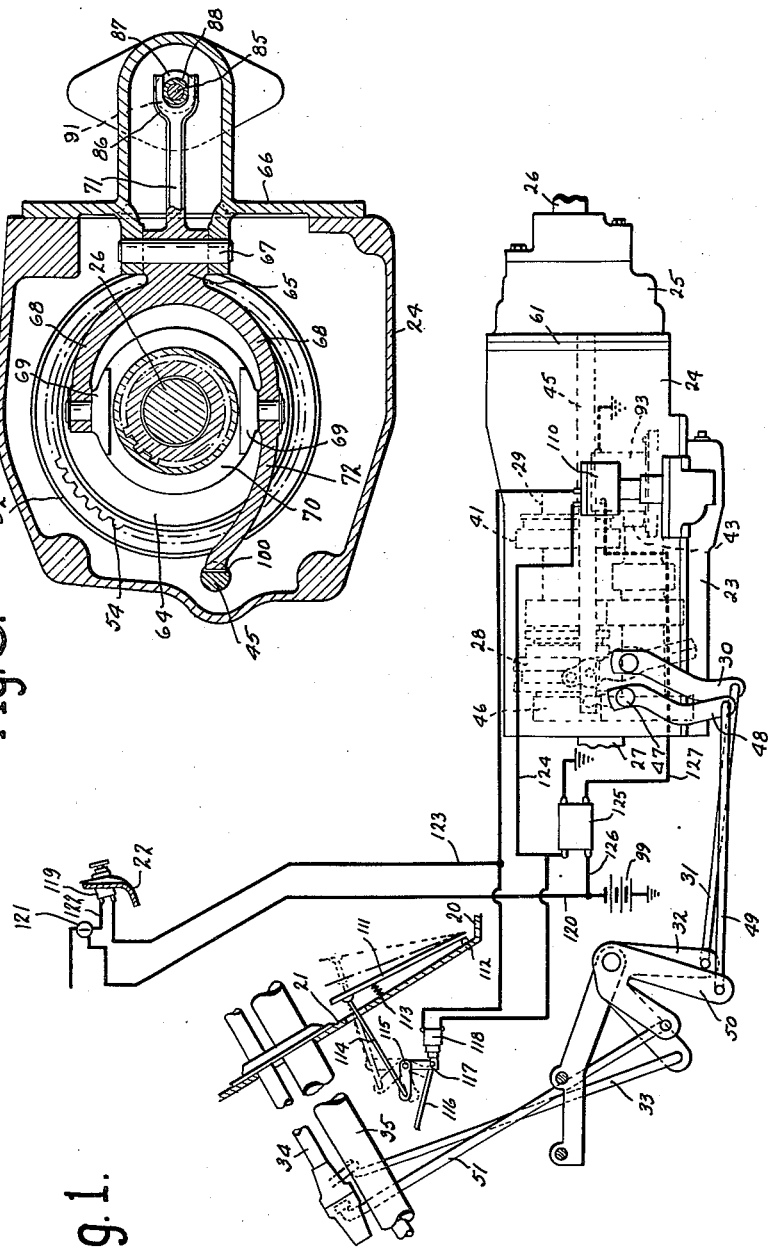
Fig. 1 is a fragmentary elevational view of a motor vehicle and transmission incorporating the invention.
Fig. 3 is a sectional view through the transmission taken on line 3—3 of Fig. 2.

The power transmission mechanism herein described is designed for use where a plurality of driving speeds are desired under varying conditions, and it is particularly adapted for use in motor vehicles. Such mechanism is shown arranged beneath the floor board 20 and toe board 21 of a motor vehicle body in which is the usual instrument panel 22. The casing structure for carrying the transmission mechanism includes generally bolted together sections 23, 24 and 25. Section 23 houses conventional selective gearing for providing a plurality of forward driving speeds and a reverse drive, section 24 houses mechanism for modifying the selected gearing drive and section 25 houses lock-out mechanism and a portion of the driven or tail shaft 26.

Drive shaft 27 extends into casing 23 and is driven from the vehicle engine (not shown). There is a forward clutch 28 for establishing direct forward drive or second speed forward drive through suitable gearing from the drive shaft to the transmission shaft 29 and such clutch is shifted by mechanism consisting of lever 30, link 31, bell crank 32 and link 33 arranged to be actuated by suitable mechanism in housing 34 extending adjacent the vehicle steering gear column 35. A toothed gear element 41 is slidably splined on the transmission shaft 29 and is arranged to be shifted to establish a driving connection with low speed forward drive gearing or to mesh with the reverse drive idler gear 42 meshing with gear 43 on a lay shaft (not shown). This gear 41 is shifted by a yoke 44 fixed on shift rod 45 and the rod is moved axially by an arm 46 on shaft 47 to which arm 48 is fixed. Link 49 connects arm 48 with bell crank 50 and link 51 connected to the bell crank is arranged to be operated by suitable mechanism in the housing 34. By means of clutch 28 and gear 41 the driver can selectively establish three forward driving speeds and a reverse drive for the transmission shaft 29.

The transmission shaft 29 extends through casing wall 52' and has a ring gear 52 of planetary gearing fixed on the end thereof extending into casing section 24. This gear is bell shaped and is formed with internal gear teeth 53 and clutch teeth 54. The tail shaft 26 projects into the gear 52 and formed on its forward end is a plate 55 which with ring 56 forms a carrier for pins 57 on which planet gears 58 are mounted. A sun gear sleeve 59 is rotatably mounted on the tail shaft and the forward end thereof has teeth 60 meshing with the planet gears. This planetary gearing is controlled to provide a direct drive from the transmission shaft to the tail shaft, or a modified drive from the transmission shaft to the tail shaft. The modified drive is preferably an underdrive that provides a speed between that of the two highest forward speeds at which the transmission shaft is driven by the gearing in casing 23.

To select the drive through the planetary gearing suitable control mechanisms are provided. The sun gear sleeve extends rearwardly into casing section 25 and through wall 61. The portion of the sleeve lying in this wall is enlarged and formed with cam surfaces 62 and rollers 63 are arranged between these cam surfaces and the adjacent surface of wall 61. When these rollers wedge, they will hold the sun gear sleeve to prevent its rotation in one direction, thus causing underdrive through the planetary gearing.

The planetary gearing is also controlled by a shiftable positive clutch ring member 64 having peripheral teeth 164 arranged to be engaged with the teeth 54 on gear 52. When this clutch ring member is so engaged the sun gear and transmission shaft gear are locked together so that the drive through the planetary will be direct. The clutch ring member is splined on the sun gear sleeve and is shiftable in an axial direction by means of actuator mechanism. An actuator 65 is pivoted to a housing 66, fixed on casing 24, by pin 67 and has arms 68 straddling the clutch, such arms being provided with fingers 69 lying in the clutch ring groove 70. The actuator has an arm 71 extending into the housing and one of the clutch ring actuator arms has an extension 72 extending into the line of movement of shift rod 45.

Within the clutch ring member 64 and the planetary gearing is arranged synchronizer mechanism that will require the ring member and gear 52 to rotate at the same speed before a coupling therebetween can be made. Such synchronizer includes blocker mechanism consisting of a member 73 and members 74 that must register in a certain relation before the teeth 164 of clutch member 64 can be engaged with teeth 54 of gear 52. The member 73 is in the form of a ring that is telescoped by the clutch member 64 and the members 74 are formed as extensions of the planet pins 57. A circular flange 75 extends forwardly from the ring 73 and is formed with recesses 76 that are widest at the forward ends forming shoulders 77 and 78. The smaller rear portion of the recesses are arranged in the ring so that the extensions 74 can enter therein with small clearance when in registration. Adjacent the peripheral portion of the ring 73 is another ring 80 having a slot across its periphery into which an anchor pin 81 protrudes from the clutch elements 64. A circular wavy spring ring 82 lies in advance of ring 80 and in advance of ring 82 is another ring 83 held against forward axial movement by a snap ring 84. The spring ring 82 lies against the ring 83 and exerts pressure against ring 80 which in turn presses the ring 73 frictionally against the radial forward side of the hub wall of the clutch member 64. Thus the ring 80 due to the pressure of spring 82, urges the blocker member 73 into frictional contact with the clutch member 64 and as the members 74 engage blocker members 73, the blocker member will synchronize the rotational speed of teeth 54 and 164 prior to their engagement.

The clutch actuator 65 is under the control of an electric and spring system. A stem 85 is slidably mounted in housing 66 and is straddled by the forked end 86 of the actuator extension 71. Abutment rings 87 and 88 encircle the stem and are arranged on opposite sides of the forked actuator end, abutment ring 87 being fixed to the stem and ring 88 being loose on the stem. A coil spring 89 encircles the stem and at its forward end bears against ring 88 while its rear end bears against an abutment ring 90 fixed on the stem. A coil spring 91 also encircles stem 85 and bears against abutment ring 87 at its rear end and against a fixed shoulder 92 at its forward end. The stem 85 forms a part of an armature of solenoid, 93, that can be of a conventional design, carried in housing 66. The coil springs 89 and 91 exert a similar force in opposite directions against the clutch actuator fork when the solenoid is deenergized which will normally place the actuator in a position engaging the teeth 164 of clutch member 64 in engagement with teeth 54 of gear 52.

In addition to the one-way sun gear holding rollers 63, there is provided a positive holding means for the sun gear sleeve. The wall 61 is formed with teeth 94 with which the internal teeth of a ring 95 mesh. A gear-like disk 96 is fixed on the sun gear sleeve and has teeth with which the teeth of ring 95 can be engaged while still engaging teeth 94. Normally the ring 95 is retained out of engagement with the teeth of disk 96 by one or more coil springs 97 encircling rods 98 fixed at their forward ends to ring 95 and slidably mounted in casing section 25 at their rear ends. This ring 95 lies in the path of movement of an extension of shift rod 45 so that when the rod is shifted from neutral position to establish reverse drive in the transmission it will abut the ring 95 and move it into engagement with the teeth of disk 96, thus locking the sun gear sleeve positively to the transmission casing to prevent its rotation in either direction. While the shift rod is in reverse drive position it will hold the ring in engagement with the toothed disk, and when moved out of reverse drive position the springs 97 will move the ring 95 out of engagement with the toothed disk.

The shift rod 45 in addition to actuating mechanism for locking the sun gear sleeve when in reverse drive position is arranged to hold clutch member 64 disengaged. The shift rod extension is formed with a shoulder 100 that engages and rocks the clutch actuator extension 72 rearwardly when shifted to reverse drive position, thus overcoming the pressure of springs 89 and 91 tending to engage the clutch member 64.

The clutch member 64 is disengaged by energizing the solenoid 93 to shift the stem 85 forwardly and thereby allow the spring 89 to rock the clutch actuator arms 68 rearwardly. In the electrical system for the solenoid is a governor controlled switch device 110 that can be of any conventional design with a governor drive from the tail shaft. This governor switch device is adjusted to automatically close above some predetermined speed so that the clutch member 64 will be thereby disengaged and to open below such predetermined speed so that the clutch member 64 can be engaged.

Two manually operable switch devices are provided for controlling the electric system leading to the solenoid. One of these devices is normally open and is closed by the accelerator pedal 111 pivoted at 112 to the toe board. The pedal is normally moved away from the toe board by a suitable spring means 113 and actuates a rod 114 fixed on shaft 115 from which engine throttle valve mechanism 116 extends. This shaft also has a bell crank 117 attached thereto for actuating a normally open switch device 118. The range of the pedal travel between engine idling and wide open throttle position is shown in dotted lines. While the pedal is pressed down beyond wide open throttle position, as shown in Fig. 1, the bell crank is actuated to close the switch device 118. The other manual control of the electric system is a conventional switch device 119 on the instrument panel 22 that can be opened or closed by the driver. The switch devices 110, 118 and 119 are in series so that they must all be closed to energize the solenoid.

The electric control system is shown diagrammatically in Fig. 1 and the battery indicated at 99 is conventional and grounded to the vehicle frame. A conductor line 120 leads from the battery to ignition switch 121 and such switch has another conductor line 122 leading to the switch device 119. Conductor line 123 leads from the switch device 119 to the governor switch device 110 and to the pedal controlled switch device 118. The governor switch is connected with grounded relay 125 by conductor line 124 which also extends to the pedal operated switch device. Conductor line 126 connects line 120 with the relay and conductor line 127 connects the relay with the grounded solenoid 93.

The pins 57 have recesses at one end into which the plate 55 is peened, as shown at 190, thus fixing the same together. The clutch member 64 is limited in its axial movement in released direction so that the pin blocker extensions 74 will always lie between faces 78 of the ring recesses 76. The ring 73 will therefore rotate with the tail shaft but can have a limited rotation relative thereto when the faces 77 block the pin extensions out of the smaller dimension portions of recess 76.

When the solenoid is deenergized, which occurs when any one of switches 110, 118, 119 or 121 is open, the spring 91 will move the actuator arm 71 to rearmost position and thus engage clutch member 64 with clutch teeth 54 of gear 52. The planetary gearing will thus be locked so that the tail shaft will be positively driven at the same speed as the transmission shaft 29. When the solenoid is energized, which occurs when all of the switches are closed, the actuator arm 71 is moved forwardly disengaging clutch member 64 from clutch teeth 54 and thus freeing the planetary gearing so that the sun gear sleeve can be held stationary by rollers 63 while the speed of the transmission shaft is greater than that of the tail shaft or by ring 95.

Opening of a switch and thereby deenergizing the solenoid does not immediately cause shifting of the clutch member into engagement because of the blocker mechanism. When the sun gear has been held stationary, it is necessary that the speed of gear 52 be lessened by closing movement of the throttle pedal so that the sun gear speeds up and after the speeds are approximately equal and there is a slight reversal of the sun gear speed relative to the speed of the gear 52, the ring 73 will shift relative to members 74 allowing them to enter the rear portions of recesses 76 under the action of the released spring 91 on the actuator 65. In other words, when the gear 52 lags a little behind the sun gear then the blocker mechanism permits the clutch to be engaged by spring 91. Direct drive will be maintained by the action of springs 89 and 91 on the actuator until all of the switches are closed to energize the solenoid and move stem 85 forwardly thereby compressing spring 91 and shorting the engine ignition momentarily through suitable switch mechanism in the electric system as shown in application Serial No. 304,990. The blocker mechanism functions as shown in Fig. 4 until torque reversal takes place so that the actuator extension as shown in Fig. 6 cannot move with the stem until torque reversal allows the extensions 74 to enter the rear portion of recesses 76 whereupon spring 89 functions to shift the actuator extension forwardly and thus disengage the clutch member 64 from gear 52.

Direct drive through the planetary occurs when the solenoid is deenergized by an open switch. The throttle controlled switch will be open and the governor switch will be closed below some predetermined speed and open above such speed, thus when the governor switch is closed the drive can be changed from direct to underdrive by pressing the accelerator pedal down beyond wide open throttle position to close the switch device 118. When the drive through the planetary gearing is modified the solenoid must be energized by closing of the various switch devices to thus disengage clutch member 64 so that the sun gear will be held stationary by either the one-way or positive holding means. When the drive is reverse the shift rod will lock the clutch member 64 in disengaged position and will place the positive sun gear holding means 95 in effective position, and thus the solenoid and spring operation of the clutch actuator cannot engage the clutch member. The blocker synchronizing mechanism associated with the clutch member will insure quick and noiseless engagement.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a transmission having change speed gearing including a shift rod operable to establish forward or reverse drive, speed modifying mechanism driven by the change speed gearing including planetary gearing and a shiftable control clutch member therefor, an actuator for the clutch member, spring and solenoid means operable to shift the clutch actuator in opposite directions, and means on the shift rod operable to lock said clutch member actuator in one of its positions when the rod is in position establishing reverse drive through the change speed gearing.

2. In a transmission, change speed gearing including a shift rod operable to establish forward or reverse drive, planetary gearing driven by the change speed gearing including a ring gear and a sun gear, a shiftable clutch member rotatable with the sun gear and engageable with the ring gear, a one-way means operable to hold said sun gear when the clutch member is released, a two-way means operable to hold the sun gear when the clutch member is released, an actuator normally engaging the clutch member, means operable to move the actuator in a direction to engage the clutch member with the ring gear, and an extension on said shift rod operable to lock said actuator in clutch releasing position and to engage the two-way sun gear holding means when said rod is shifted for reverse drive from the change speed gearing.

3. In a transmission, a change speed gearing, a shouldered shift rod operable to establish forward or reverse drive from the gearing, a tail shaft, planetary gearing drivingly connecting the change speed gearing and the tail shaft, said gearing including a ring gear, a sun gear and planet gears meshing with said gears, a slidable clutch member operable to lock or release the sun gear from the ring gear, means for holding said sun gear against rotation in one direction when said clutch is released, means for positively holding said sun gear when said clutch member is released, and a clutch member actuator extending into the path of movement of said shift rod, said shouldered portion of said rod holding said actuator in clutch member releasing position and said rod shifting said positive holding means into effective position when said rod is shifted to establish reverse drive from the change speed gearing.

4. In a transmission, speed modifying mechanism comprising a driving ring gear, a sun gear fixed on a sleeve, a one-way brake for holding said sun gear when freely rotatable, planet gears meshing with the ring and sun gears and mounted to drive, a clutch member slidably splined on the sun gear sleeve and engageable with said ring gear, a pivoted actuator for shifting said clutch member, a solenoid operated shaft operable to rock said actuator in one direction, spring means opposing operation of said shaft by the solenoid, and means operable to lock said sleeve from rotating in either direction.

5. In a transmission, speed modifying mechanism comprising a planetary gearing having a sun gear sleeve as one element with cam surfaces and teeth, roller means operable to wedge against said cam surfaces to prevent rotation of the sleeve in one direction when idling, shiftable means operable to engage the sleeve teeth and prevent rotation of the sleeve in either direction, and means for locking the sleeve with another element of the planetary gearing.

6. In a transmission speed modifying mechanism having planet gears carried on pins fixed to a tail shaft, a driver ring gear meshing with the planet gears and having clutch teeth, a sun gear meshing with the planet gear and fixed on a sleeve and a positive clutch member shiftable on the sleeve and engageable with the ring gear teeth, synchronizing mechanism comprising a ring in the clutch member, spring means frictionally engaging the ring with the clutch member, and blocker mechanism including planet gear pin extensions and a flanged extension of the ring, said flanged extension having recesses in which the pin extensions project, said recesses being wider than the pin extensions at their ends adjacent the planet gears and substantially the same width as the pin extensions at their ends remote from the planet gears.

7. In a transmission speed modifying mechanism including planet gears, pin mountings for the planet gears, a driven carrier to which the pins are fixed, a ring gear meshing with the planet gears and having clutch teeth, a sun gear meshing with the planet gears and having a shaft adapted to be held when the gearing runs free, a clutch member slidably splined on the sun gear sleeve and engageable with said ring gear clutch teeth, spring means operable to engage said clutch member with said clutch teeth, and synchronizing mechanism including interrelated blocker and driver means including planet gear pin extensions and a friction ring in the clutch member.

8. In a transmission speed modifying mechanism, planetary gearing, clutch means for locking or releasing said gearing, a pivoted actuator for the clutch means, opposed coil springs acting against said actuator to normally engage said clutch means, a solenoid operated shaft around which the springs extend, anchor means for the spring ends adjacent the actuator, one of said anchor means being fixed to the shaft and the other anchor means being slidable on the shaft, an anchor means fixed to the shaft for the spring end having the slidable anchor means on the shaft, and a fixed anchor means for the other end of the spring having the fixed anchor means adjacent the actuator.

9. In a motor vehicle transmission speed modifying mechanism, planetary gearing, clutch means for locking or releasing said gearing, pivoted actuator means for the clutch means, opposed coil springs normally engaging said clutch actuator means, a shaft operable to overcome the pressure of one spring so that the other spring will rock the actuator means to disengage the clutch means, a solenoid for operating the shaft in opposition to spring pressure, and circuit means under control of the vehicle driver for controlling said solenoid.

JESSE G. VINCENT.